UNITED STATES PATENT OFFICE.

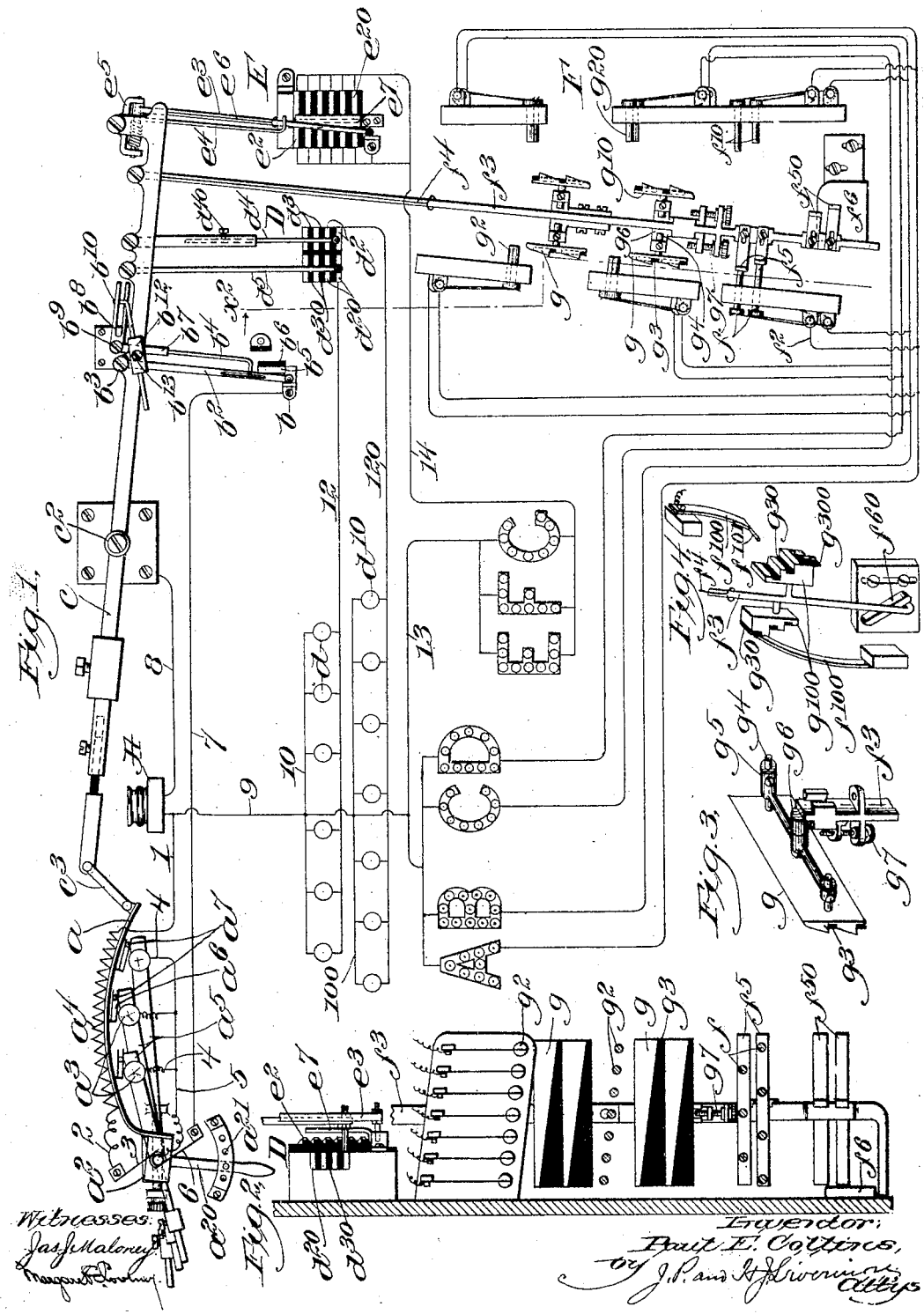

PAUL E. COLLINS, OF BOSTON, MASSACHUSETTS, ASSIGNOR, BY DIRECT AND MESNE ASSIGNMENTS, TO ELECTRIC NOVELTY MACHINE COMPANY, OF BOSTON, MASSACHUSETTS, A CORPORATION OF MASSACHUSETTS.

ILLUMINATING APPARATUS.

No. 802,370.      Specification of Letters Patent.      Patented Oct. 24, 1905.

Application filed August 29, 1904. Serial No. 222,620.

*To all whom it may concern:*

Be it known that I, PAUL E. COLLINS, a citizen of the United States, residing in Boston, county of Suffolk, and State of Massachusetts, have invented an Improvement in Illuminating Apparatus, of which the following description, in connection with the accompanying drawings, is a specification, like characters on the drawings representing like parts.

The present invention relates to an illuminating apparatus and is shown as embodied in an electrical illuminating apparatus for signs, pictures, and the like, the invention being mainly embodied in a novel switch-controlling mechanism for alternately lighting and putting out the lamps installed in the sign or picture to be illuminated.

In accordance with the invention the switches are controlled by a thermostat which is heated by a current of electricity flowing through a resistance or through a series of lamps in proximity to the thermostat, the said thermostat controlling a main switch, which is closed when the thermostat is cool and opened after the thermostat becomes heated, so that a current of some duration is passed through all of the circuits employed, said current, however, being cut off at intervals. The movement of the thermostat is further employed to control secondary switches for producing attractive effects for intermittent illumination of signs, or parts of signs, or parts of pictures. To illustrate the invention, I have shown three sets of switches controlled by the thermostat, one of said switches being arranged to produce a more or less rapid intermittent lighting of a number of small lamps and another to produce the intermittent lighting or illuminating of the letters constituting a sign, while the third is arranged to illuminate an entire sign when the current is first caused to flow by the closure of the switch controlled by the thermostat, then to put out the lights in the entire sign, then to light one letter at a time in the sign, and, finally, to illuminate the entire sign again until the current is cut off by the next movement of the thermostat.

Figure 1 is a general diagram of the circuits employed, while the thermostat and devices controlled thereby are shown in elevation. Fig. 2 is a section on line $x^2$ of Fig. 1. Fig. 3 is a detail showing means for adjusting the circuit-controlling brushes, and Fig. 4 is a detail showing a modification.

The thermostat $a$, which may be of any suitable or usual construction—such, for example, as a sheet of steel and a sheet of hard rubber riveted together—is mounted on a support $a^2$ and is arranged to be heated by an electric current flowing through a series of lamps $a^3$ or resistance $a^4$, or both. In order to maintain the lamps $a^3$ in proximity to the thermostat throughout the entire movement thereof, the said lamps are shown as mounted on levers $a^5$, which are pivotally supported and connected at a point near where the lamps are located with the thermostat by means of the guide members $a^6$, which are shown as forked or slotted pieces of metal connected with the thermostat and engaging pins $a^7$, which project from the levers $a^5$. The lamps $a^3$ and resistance $a^4$ are included in a circuit starting with conductors 1 and 2, the conductor 2 being connected with a brush 3, resting on a contact on the lever $a^5$, there being, of course, a brush in contact with each lever, the lever itself serving to conduct the current to one terminal of the lamp. From the lamps the circuit continues through conductors 4 to a conductor 5, connected with a brush 6, which in turn is connected with the conductor 7, leading to a switch member $b$, the other member $b^2$ of the switch constituting a conductor which leads to a lever $c$ and thence through a conductor 8 to the other terminal of the source, which is herein shown as a plug A, adapted to be screwed into a lamp-socket. The lever $c$ has a fixed pivotal support $c^2$ and is connected, as by a link $c^3$, with the thermostat $a$, so that the movement of the said thermostat rocks the lever $c$ on its pivot, producing a movement of the switch member $b^2$, so as to control the heating-circuit for the thermostat in response to the movement of the thermostat itself. In order that the movement of the lever $c$ may continue for some length of time to produce the operation of the other switches controlled thereby, the circuit-controlling member $b^2$ is arranged to be kept in contact with the member $b$ during a considerable movement of the lever $c$ aforesaid. As herein shown, the member $b^2$ is in the form of an arm pivotally connected at $b^3$ with the lever $c$ and acted upon by a spring $b^4$, which tends to hold the arm $b^2$ substantially at a right angle to the lever $c$. Starting from the position shown in Fig. 1, as the thermostat heats it pulls upon the link $c^3$, gradually rocking the lever $c$ and pulling the arm $b^2$ upward. The contact $b$ is provided with a supplementary contact portion $b^5$ beyond the main portion $b$, the spring $b^4$ tending to pull the arm $b^2$ toward the contact member $b^5$ and finally to move it beyond said member, thereby breaking the circuit. As the thermostat cools the lever $c$ will return to the position shown in Fig. 1, the arm $b^2$ passing around the contact $b^5$, the spring holding it in contact with an insulating-piece $b^6$ until it gets beyond the said insulating-piece and snaps back into contact with the terminal $b$. In order to control the action of the spring when the operating movement is comparatively short, I have shown the spring as connected with an elbow-lever having arms $b^7$ and $b^8$ and a fixed pivotal support $b^9$, the arm $b^8$ being connected with the lever $c$ by an adjustable rod $b^{10}$, herein shown as longitudinally movable and capable of turning in a socket $b^{12}$, being held therein after adjustment by a set-screw $b^{13}$. By the adjustment of the rod, therefore, the amount of movement of the rock-shaft relative to that of the lever $c$ may be varied, so that the spring may be given sufficient tension to operate properly to throw the switch even if the lever $c$ is caused to move only a short distance. The illuminating-circuits are thus supplied with current for an interval of time while the thermostat is being heated and deprived of current while the thermostat is cooling, so that a sign or picture can be illuminated at intervals if included in the circuit.

In order that the contacts above described may be brought to the proper initial position regardless of discrepancies in the shape of the thermostat, I have shown the thermostat-support $a^2$ as mounted on a rock-shaft provided with a handle $a^{20}$, which may be secured in any desired position by means of pins passed through openings $a^{21}$ in a segmental guide or support. This adjustment is also useful and desirable on account of the influence of the weather on the thermostat.

While, as hereinbefore stated, a picture or sign may be included in the thermostat-circuit and thereby illuminated as a whole at intervals, I prefer to provide the apparatus with other circuit-controllers of novel construction and arrangement which further control the intermittent illumination during the movement of the thermostat. As herein illustrated, these controllers are in circuits independent of the thermostat-circuit, so that the lamps supplied with current thereby may be controlled during both movements of the said thermostat.

I have shown herein three sets of switches all under the control of the lever $c$, each of said switches being adapted for a different kind of illumination, it being obvious that all of these may be used at one time or that any one may be used independently of the others. Switch D is intended to control a number of lamps $d$ of small candle-power and to cause them to be rapidly lighted and extinguished one after another, so as to produce a wavy or fluttering effect. This switch comprises the contact-plates $d^2$ and $d^{20}$, separated from each other by the insulating members $d^3$ and $d^{30}$, and the current is controlled by means of contact-arms $d^4$ and $d^5$, pivotally connected with the lever $c$, so as to move back and forth and to engage alternately with the contacts and insulation. The circuit through the lamps $d$ may be traced as follows: conductor 9, conductor 10, the lamps $d$ in multiple to conductor 12, the contacts $d^{20}$, arm $d^5$, lever $c$, conductor 8 back to the source A. Another bank of lamps $d^{10}$ are included in a substantially similar circuit, including the conductor 100 and the conductor 120, the contacts $d^2$, and the arm $d^4$, which is shown as adjustable lengthwise, being held in position as by a set-screw $d^{40}$. In this way the arm $d^4$ may be adjusted so as to be a trifle in advance of or behind the arm $d^5$, so that one bank of lamps may be lighted slightly in advance of the other, thus producing a wavy or rippling effect. The switch E is intended to control heavier currents and is shown as controlling the circuit through a complete sign indicated by the letters E F G, it being necessary in this case to separate the contacts by a rapid movement to prevent arcing as the circuit is broken. For this purpose the contact members $e^2$ each coöperate during the upward movement of the lever $c$ with a conducting-arm $e^3$ connected with the lever and are mounted on ratchet-teeth of insulating material, as best shown in Fig. 2, so that they are separated by some distance, while a quick rupture of the circuit is made as the arm $e^3$ drops from the contacts to the insulation between them. The said arm $e^3$ is held against the contacts by means of a spring $e^4$, which is mounted in a bearing $e^5$, pivotally connected with the lever $c$. The arm $e^3$ is further controlled by means of a spring $e^6$, the action of which is similar to that of the spring $b^4$, previously described, the tendency of the said spring $e^6$ being to maintain the arm $e^3$ at a certain angle to the lever $c$. As the lever $c$ rises, therefore, the spring $e^6$ holds the end of the arm $e^3$ against a stop $e^7$, which separates the set of contacts $e^2$ from another similar set $e^{20}$ until the end of said arm passes beyond the said stop $e^7$, when the spring $e^6$ will force it to the opposite side, so that in the return movement it will coöperate with the contacts $e^{20}$, which are beveled in the opposite direction. The circuit through the sign E F G, controlled by this switch, includes the conductor 9, a conductor 13, and conductor 14, which connects with the contacts $e^2$ and $e^{20}$, the remainder of the circuit being through the lever $c$, as previously traced. By the operation of this switch the sign E F G is illuminated as a whole at more or less rapid intervals during the movement of the thermostat in each direction.

The switch shown at F is designed for the purpose of illuminating a sign, for example, in the following way: The sign is first wholly illuminated, then extinguished, and one letter at a time lighted and kept lighted until finally the entire sign is wholly lighted, after which it is again extinguished. Assuming, for example, that the letters "A B" represent one word and the letters "C D" another word, both of which together constitute a sign such as a proprietor's name, the entire sign is illuminated as a whole when the thermostat is in either of its extreme positions and then becomes extinguished as a whole during the first movement of the thermostat, while during the remaining movement of the thermostat the letters are illuminated successively, the "A" and "C" first appearing, then the "B" and "D," &c., each letter when once illuminated remaining so until the sign is extinguished as a whole.

The switches which control the complete illumination of the sign have the members $f$, which consist of pins each of which is connected with an independent conductor, as $f^2$, leading to a letter of the sign, the circuit through the letters being completed by the conductor 9, the lever $c$, and the main switch member $f^3$, which is shown as an arm pivotally connected with the lever $c$ and provided with a spring $f^4$, the action of which is similar to that of the spring $e^6$, previously described. I have herein shown two sets of pins, one above the other, the pins in one set being connected respectively with the letters of one word and the pins in the other set being connected with the letters of the other word. Furthermore, both sets are duplicated, as indicated at $f^{10}$, the pins $f^{10}$ being mounted in a separate support and arranged to operate when the thermostat is in the opposite position from that shown. The circuits controlled by these pins are completed by means of adjustable contact members $f^5$, connected with the arm $f^3$, it being obvious that as the arm $f^3$ begins to travel upward the members $f^5$ will pass beyond the pins $f$, and thereby break the circuit soon after the thermostat begins to move. The entire sign then becomes extinguished and remains so, subject to the control of the other switches, as will be hereinafter described, until the thermostat has practically completed its movement, at the end of which time the arm $f^3$ has traveled beyond a stop member $f^6$, when the spring $f^4$ acts to throw the arm $f^3$ to the right, thus bringing contact members $f^{50}$ into engagement with the pins $f^{10}$, so as to illuminate the sign again as a whole. In the meanwhile—that is to say, during the movement of the thermostat while the circuits of the pins above described are broken—individual circuits through the several letters are controlled by means of switch members $g$, electrically connected with the arm $f^3$ and arranged to engage with pins $g^2$, there being a pin for each letter and each pin being connected with an individual conductor leading to the letter controlled by it. These pins $g^2$, as best shown in Fig. 2, are arranged along a line which is inclined with relation to the direction of movement of the arm $f^3$, so that they will be engaged one at a time during each movement by the switch members $g$, which are wider at one end than at the other. As herein shown, each switch member is provided with two conducting portions separated by insulation $g^3$, and there may be as many conducting portions as desired, the construction shown being such as to extinguish the entire sign and relight the letters consecutively during a complete movement of the thermostat. As the arm $f^3$ travels up one of the pins $g^2$ will first come into contact with the conducting portion $g$ of the switch member, this pin illuminating one letter or two letters, as the case may be, the arrangement of circuits herein shown being such as to cause the first pin to illuminate the letter "A" and the letter "C." Owing to the shape of the contact $g$ this pin will remain in engagement therewith during the subsequent engagement of the other pins successively, so that the sign will become illuminated one letter at a time until the entire sign appears. The pins then all pass into engagement with the insulation $g^3$, thus extinguishing the entire sign, a similar illuminating operation being repeated as the pins come into engagement with the next conducting portion. In order to avoid complicating the drawings, I have shown in Fig. 1 only two pins of each set, also showing only two letters of each word of the sign controlled by the switch F. The switch members $g$ and the pins $g^2$ are duplicated, as indicated at $g^{10}$ and $g^{20}$, so that the same operation takes place during the movement of the thermostat in each direction, the switch-arm $f^3$ being controlled, as stated, by the stop member $f^6$. For purposes of adjustment I have shown the switch members $g$ as provided with pins $g^4$, which project through sockets $g^5$ in a retaining member $g^6$, which member is set in a dovetailed groove in the arm $f^3$ and vertically positioned by means of an adjusting-screw $g^7$. In the construction shown where the sign has two words there is a set of pins for each word and a switch member for each set of pins, the upper pins being shown as connected with the letters "C" "D" and the lower pins as connected with the letters "A" "B."

In some cases it may be desirable to dispense with the pins $f$, and in Fig. 4 a modification is shown in which the switch-arm $f^3$ is provided with contact members $g^{100}$, which are shown as provided with insulating material $g^{30}$, the said members $g^{100}$ being cut in steps, so that in the travel of the arm $f^3$ spring switch members $f^{100}$ will ride over the insulating portion and metallic portion consecutively, thereby making and breaking the circuit. The switch-arm $f^3$ is controlled in its upward and downward movement by a guide $f^{60}$, which causes one or the other of the members $g^{100}$ to remain in contact with one or the other spring members $f^{100}$ in accordance with its direction of movement. In the first movement of the contact members $g^{100}$, which are in operative position in response to the action of the rheostat, the member $f^{100}$ is over the insulating material, and in order to prevent arcing and the consequent turning out of the contacts the movement of one part relative to the other must not be too slow. If, therefore, the member $f^{100}$ came into direct contact with the insulating material $g^{30}$ when the arm $f^3$ was first shifted, it would be necessary to have it come into such contact at some distance from the metallic contact member, and considerable time would be consumed before the action of the rheostat would cause the arm $f^3$ to travel far enough to light the sign. To obviate this loss of time, one of the movable switch members $g^{100}$ is provided with an adjustable insulated block $g^{300}$, which projects beyond the surface of the first contact portion of the members $g^{100}$, said member $g^{300}$ being engaged by a pin or projection $f^{101}$ on one of the members $f^{100}$. A very slight movement of the arm $f^3$, therefore, will cause the projection $f^{101}$ to become disengaged, and the members $g^{100}$, without any chance of arcing, as would be the case if it first came into contact with insulation on the level of the metallic contact and in a position near enough to said metallic contact to come into actual contact therewith on the first movement of the arm $f^3$.

What I claim is—

1. In an electrical illuminating device, the combination with a thermostat; of electrical heating appliances in proximity thereto; an arm or lever connected with said thermostat; a circuit-controlling arm pivotally connected with said lever and provided with a retaining-spring; and a coöperating circuit-closer to remain in contact with said arm during a portion of the movement of the thermostat, the said spring acting on said arm to keep it out of contact during the movement of the thermostat in the opposite direction.

2. In an electrical illuminating device, the combination with a thermostat; of a series of lamps in proximity thereto; a circuit-controller for said lamps operated by the thermostat; a pivotally-supported member for each lamp; and means for connecting said members with the thermostat to maintain the same in proximity thereto during the movement thereof.

3. In an electric illuminating device, the combination with a thermostat; of means for electrically heating the same; a circuit-controller for the heating-circuit, operated by the thermostat; a switch member pivotally connected with a lever operated by the thermostat, and provided with a spring to maintain it in a definite normal position with relation to said lever; a guide member to resist the operation of said spring; and sets of contacts at opposite sides of said guide member to coöperate with said contact member alternately in accordance with the direction of the movement of the thermostat, as set forth.

4. In an electric illuminating device, the combination with a traveling switch member; of a number of elements to be illuminated each provided with an individual terminal conductor connected with a contact-pin, said pins being inclined with relation to the direction of the movement of the traveling contact member; and a conducting portion of said traveling contact member, triangular in shape, to engage said pins, one after another, the inclined side of said member being substantially parallel to the line of pins, whereby the pins are disengaged substantially simultaneously substantially as described.

5. In an electric illuminating device, the combination with a thermostat; of a number of electric circuits each having a terminal consisting of a spring-supported pin, and a contact member connected with the thermostat to travel past said pins in contact with the ends thereof, said contact member having an inclined surface terminating in a shoulder; and insulating material beyond said shoulder.

6. In an electric illuminating apparatus, the combination with a traveling lever; of an arm pivotally connected therewith and carrying a contact portion; a fixed contact to coöperate therewith; a spring connected with said arm and with a lever having a fixed pivotal support; and adjustable means for connecting the traveling lever with the lever connected with the spring.

7. The combination with two banks of electric lamps; of two series of contact members connected respectively with the terminals of each bank of lamps; two movable switch members common to the other terminals of the lamps in the respective banks; and means for moving said switch members together over said contacts, the switch members and contacts being so arranged that a lamp in one bank will be lighted a little before a lamp in the other bank, whereby a wavy or fluttering effect is obtained.

8. The combination with a thermostat formed of sheets of material having different coefficients of expansion fastened together; of electric heating devices in proximity thereto; a circuit-controller controlling a circuit containing said heating devices; a pivotally-supported lever connected with the thermostat and with one member of said circuit-controller; and an adjustable support for said thermostat, as set forth.

9. The combination with a thermostat; of a lever connected therewith; contact-pieces adjustably connected with said lever, and fixed contact-pieces coöperating therewith, as set forth.

10. The combination with a thermostat; of a contact-carrying arm connected therewith; a switch member pivotally connected with said arm and provided with a spring; a series of fixed contacts toward which said switch member is pressed by said spring; and an insulating support for said contact formed with ratchet-like teeth, each contact being supported on one of said teeth, substantially as and for the purpose set forth.

In testimony whereof I have signed my name to this specification in the presence of two subscribing witnesses.

PAUL E. COLLINS.

Witnesses:
 HENRY J. LIVERMORE,
 JAS. J. MALONEY.